United States Patent
Fleck et al.

(10) Patent No.: US 11,424,471 B2
(45) Date of Patent: Aug. 23, 2022

(54) REDOX FLOW BATTERY

(71) Applicant: Siemens Aktiengesellschaft, Munich (DE)

(72) Inventors: Robert Fleck, Adelsdorf (DE); Barbara Schricker, Erlangen (DE); Jochen Friedl, Newcastle Upon Tyne (GB); Holger Wolfschmidt, Erlangen (DE); Matthäa Schwob, Newcastle Upon Tyne (GB); Ulrich Stimming, Newcastle Upon Tyne (GB)

(73) Assignee: SIEMENS AKTIENGESELLSCHAFT, Munich (DE)

(*) Notice: Subject to any disclaimer, the term of this patent is extended or adjusted under 35 U.S.C. 154(b) by 95 days.

(21) Appl. No.: 16/636,221

(22) PCT Filed: Jul. 18, 2018

(86) PCT No.: PCT/EP2018/069538
§ 371 (c)(1),
(2) Date: Feb. 3, 2020

(87) PCT Pub. No.: WO2019/025190
PCT Pub. Date: Feb. 7, 2019

(65) Prior Publication Data
US 2020/0168938 A1 May 28, 2020

(30) Foreign Application Priority Data
Aug. 4, 2017 (EP) .................................... 17275122

(51) Int. Cl.
*H01M 8/18* (2006.01)

(52) U.S. Cl.
CPC .................................. *H01M 8/188* (2013.01)

(58) Field of Classification Search
None
See application file for complete search history.

(56) References Cited

U.S. PATENT DOCUMENTS

| 2011/0244277 A1 | 10/2011 | Gordon, II et al. | 429/51 |
| 2011/0274988 A1 | 11/2011 | Fan et al. | 429/401 |

(Continued)

FOREIGN PATENT DOCUMENTS

| WO | 2012/033692 A2 | 3/2012 | H01M 14/00 |
| WO | 2019/025190 A1 | 2/2019 | H01M 4/02 |

OTHER PUBLICATIONS

International Search Report and Written Opinion, Application No. PCT/EP2018/069538, 16 pages, dated Sep. 5, 2018.

*Primary Examiner* — Wyatt P McConnell
(74) *Attorney, Agent, or Firm* — Slayden Grubert Beard PLLC

(57) ABSTRACT

Various embodiments include an electrically rechargeable redox flow battery comprising: a first chamber; a second chamber; a membrane separating the first chamber from the second chamber; a cathode in the first chamber; and an anode in the second chamber. At least one of the cathode and the anode comprises a first planar surface including elevations enlarging the surface area. The elevations form flow channels for an electrolyte. The at least one of the cathode and the anode further comprises a material selected from the group consisting of: lead, bismuth, zinc, titanium, molybdenum, and tungsten.

11 Claims, 5 Drawing Sheets

(56) References Cited

U.S. PATENT DOCUMENTS

| | | | |
|---|---|---|---|
| 2014/0050947 A1* | 2/2014 | Donnelly | H01G 11/62 429/7 |
| 2014/0060666 A1* | 3/2014 | Evans | H01M 50/60 137/260 |

* cited by examiner

REDOX FLOW BATTERY

CROSS-REFERENCE TO RELATED APPLICATIONS

This application is a U.S. National Stage Application of International Application No. PCT/EP2018/069538 filed Jul. 18, 2018, which designates the United States of America, and claims priority to DE Application No. 17275122.4 filed Aug. 4, 2017, the contents of which are hereby incorporated by reference in their entirety.

TECHNICAL FIELD

The present disclosure relates to batteries. Various embodiments may include redox flow batteries and/or methods for operating a redox flow battery.

BACKGROUND

The demand for power fluctuates significantly over the course of the day. With an increasing proportion of power from renewable energies, power generation also fluctuates during the course of the day. In order to be able to compensate for excess supply of power in periods with lots of sun and strong wind when demand for power is low, controllable power plants or storage means are required for storing this energy.

Batteries are means for storing electrical energy on an electrochemical basis and are suitable for storing the excess energy. A rechargeable storage means is also called an accumulator. An individual rechargeable storage element is also called a secondary element.

In contrast to conventional secondary elements, the electrode active material in redox flow batteries is liquid. This liquid electrolyte is stored in a tank and pumped into a cathode chamber having a cathode and/or into an anode chamber having an anode. The liquid electrolyte therefore typically comprises a reduction-oxidation pair as electrode active material.

The electrode active material is reduced or oxidized at the electrodes. The electrodes typically comprise graphite or carbon. The structure of the electrodes is typically formed in a porous fashion in the manner of a fibrous web or a sheet, or in other words in the form of a lattice or structural element, in order to provide a maximum surface area of the electrodes. The hydrogen formation reaction (hydrogen evolution reaction, HER) takes place at these electrodes. This leads to unequal charge ratios between anolyte and catholyte. The Faraday efficiency is adversely considerably reduced as a result.

SUMMARY

The teachings of the present disclosure include redox flow batteries and methods for operating a redox flow battery, the battery having an improved Faraday efficiency. For example, some embodiments include an electrically rechargeable redox flow battery (1) having a first chamber (4) and a second chamber (5), wherein the first chamber (4) is separated from the second chamber (5) by means of a membrane (3), wherein the first chamber (4) comprises a cathode (30) and the second chamber (5) comprises an anode (16), and wherein a first planar surface of the cathode (30) and/or a second planar surface of the anode (16) have elevations (27) for enlarging the surface area and these elevations (27) are suitable for forming flow channels (26) for a first and/or second electrolyte of the redox flow battery (1), wherein the cathode (30) and/or the anode (16) comprise at least a first material (25) comprising lead, bismuth, zinc, titanium, molybdenum or tungsten.

In some embodiments, the cathode (30) and/or anode (16) comprise lead or bismuth as the first material (25).

In some embodiments, the elevations (27) have a first long side and a second short side (36).

In some embodiments, the elevations (27) are arranged in parallel or in a meandering form.

In some embodiments, the first material (25) comprises lead or bismuth in a proportion by weight of at least 20%.

In some embodiments, the first material (25) comprises lead or bismuth in a proportion by weight of at least 40%.

In some embodiments, the cathode (30) and/or the anode (16) are at least partially in direct contact with the membrane (3).

In some embodiments, the cathode (30) and/or the anode (16) comprise a second material (28) and wherein the second material (28) comprises polymer fibers or carbon fibers.

In some embodiments, a proportion by weight of the second material is at least 10%.

In some embodiments, the first material (25) is arranged as a layer on the second material (28).

In some embodiments, the anode (16) and/or cathode (30) are a ball electrode or a rod electrode.

As another example, some embodiments include a method for operating a redox flow battery (1) comprising the following steps: providing a redox flow battery (1) having a first chamber (4) and a second chamber (5), wherein the first chamber (4) is separated from the second chamber (5) by means of a membrane (3), wherein the first chamber (4) comprises a cathode (30) and the second chamber (5) comprises an anode (16), wherein a first surface of the cathode (30) and/or a second surface of the anode (16) have elevations (27) for enlarging the surface area and these elevations (27) are suitable for forming flow channels (26) for a first and/or second electrolyte of the redox flow battery (1), and the cathode (30) and/or the anode (16) comprise at least a first material (25) comprising lead, bismuth, zinc, titanium, molybdenum or tungsten, conducting a first electrolyte into the first chamber (4) and conducting a second electrolyte into the second chamber (5), and charging or discharging the redox flow battery (1).

In some embodiments, polyoxometalate is used as a reduction-oxidation pair in the electrolyte.

BRIEF DESCRIPTION OF THE DRAWINGS

Further features, properties, and advantages of various embodiments of the teachings of the present disclosure will be apparent from the following description with reference to the appended figures.

DETAILED DESCRIPTION

Figure 1:
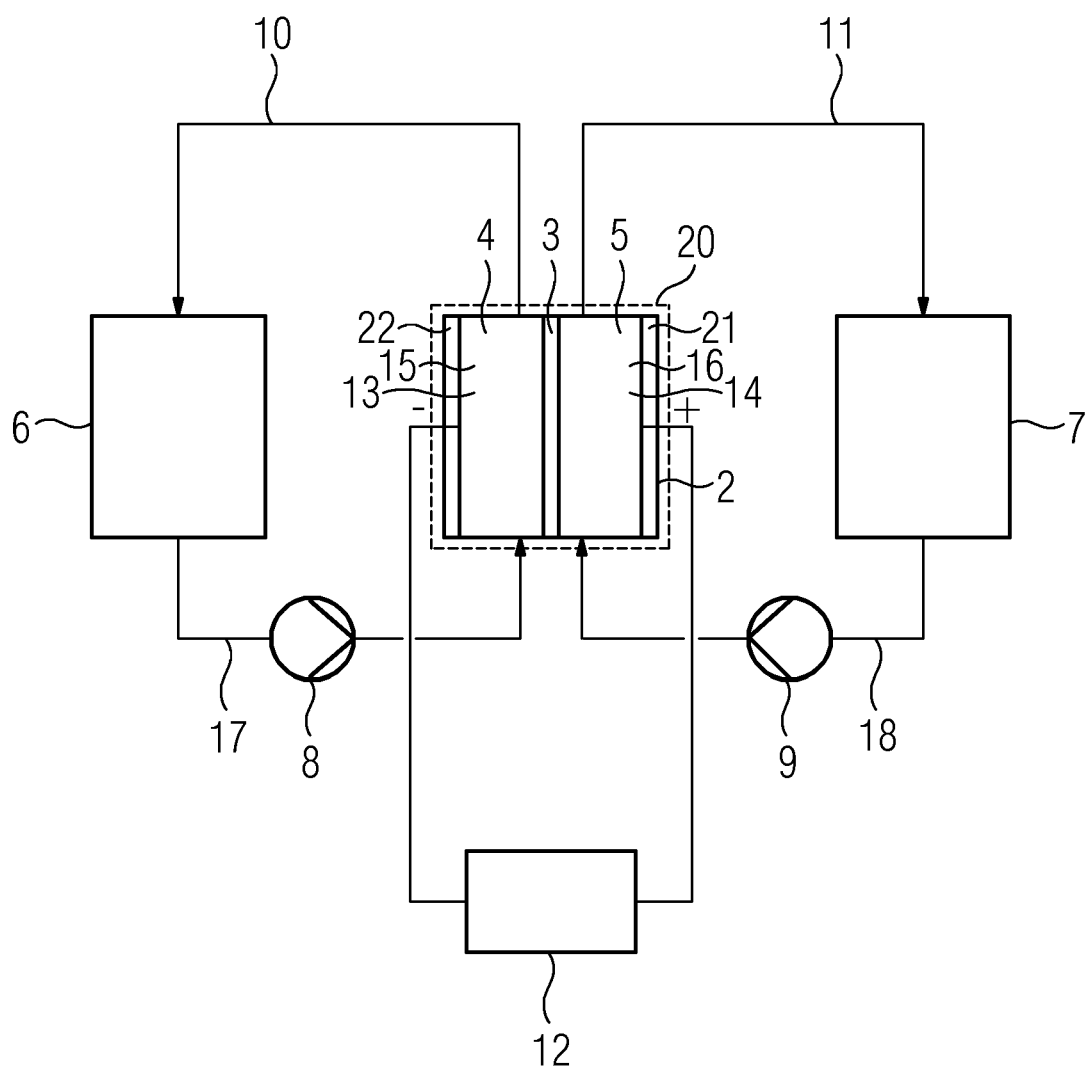
FIG. 1 shows a rechargeable redox flow battery having a redox flow unit with planar electrode.

Various embodiments of the teachings herein include an electrically rechargeable redox flow battery comprises a first chamber and a second chamber. The first chamber is separated from the second chamber by means of a membrane. The first chamber comprises a cathode and the second chamber comprises an anode. A first planar surface of the cathode and/or a second planar surface of the anode have elevations for enlarging the surface area. These elevations are suitable for forming flow channels for an electrolyte of the redox flow battery. The cathode and/or the anode comprise at least a first material, wherein the material comprises lead, bismuth, zinc, titanium, molybdenum or tungsten.

Some embodiments include a method for operating a redox flow battery comprising a plurality of steps. Firstly, a redox flow battery having a first chamber and a second chamber is provided. The first chamber is separated from the second chamber by means of a membrane. The first chamber comprises a cathode and the second chamber comprises an anode. A first surface of the cathode and/or a second surface of the anode have elevations for enlarging the surface area. These elevations are suitable for forming flow channels for a first and/or second electrolyte of the redox flow battery. The cathode and/or the anode comprise at least a first material, wherein the first material comprises lead, bismuth, zinc, titanium, molybdenum or tungsten. A first electrolyte is conducted into the first chamber and a second electrolyte is conducted into the second chamber. The charging or discharging of the redox flow battery is then effected in the two chambers.

In some embodiments, the cathode and/or the anode are essentially planar. Elevations are arranged on the cathode and/or the anode. "Elevations" are understood here to mean structured elevations, especially in the form of cylindrical, cubic, pyramidal or hemispherical elevations. Flow channels through which the first and/or second electrolyte can flow are formed between the elevations.

In some embodiments, the materials lead, bismuth, zinc, titanium, molybdenum or tungsten are used; they have a higher overvoltage potential with respect to hydrogen evolution than customary carbon or graphite electrodes. In particular, the overvoltage potential with respect to hydrogen is less than −0.6 V at 25° C. As a result, the electric potential applied to the anode can be more negative than with carbon or graphite electrodes, which makes it possible to transfer more electrons from the anode to the cathode per molecule of the reduction-oxidation pair. This increases the Faraday efficiency and thus the overall efficiency of the redox flow battery. The electric current is therefore conveyed efficiently to a reduction-oxidation pair in the electrolyte, by virtue of the latter being reduced/oxidized. The hydrogen evolution reaction competing with this reaction is reduced considerably. In addition, a divergence of the first electrolyte, that is to say the catholyte, and the second electrolyte, that is to say the anolyte, with regard to pH is avoided.

In particular when polyoxometalates are used as reduction-oxidation pair, the altered pH damages the polyoxometalates, especially in the anolyte, on account of the use of a proton during the hydrogen evolution. If the hydrogen evolution reaction is diminished, the redox flow battery can advantageously be operated for a longer time without the first and/or second electrolyte needing to be exchanged.

In some embodiments, the planar or flat electrodes reduce the pressure drop along the electrode in the flow direction of the electrode. This may improve the energy efficiency of the redox flow battery.

In some embodiments, the cathode and/or anode comprises lead or bismuth as the first material. These materials can be used with organic quinone-based reduction-oxidation pairs, in particular AQDSH2/AQDS (AQDS means 9,10-anthraquinone-2,7-disulfonic acid) and $Br_2/2HBr$. It is likewise possible to use lead or bismuth as electrode material with organic polymer-based reduction-oxidation pairs, in particular polymers having a TEMPO/TEMPO+ basis (TEMPO means 2,2,6,6-tetramethylpiperidinyloxyl) and based on viologens, in other words N,N'-dialkyl-4,4'-bipyridines ($viol2^-/viol^+$). Lead and bismuth are readily available and inexpensive compared to other materials.

In some embodiments, the elevations have a first long side and a second short side. The elevations are thus of essentially rectangular design. Elongate flow channels through which the first and/or second electrolyte can flow are formed as a result between the elevations. The elevations are in particular arranged in parallel or in a meandering form. In the case of the parallel arrangement, parallel flow channels are formed and as a result the first and/or second electrolyte is conducted through the redox flow battery through a plurality of individual flow channels. In the case of elevations arranged in a meandering form and thus also of flow channels of meandering form, one long flow channel through the redox flow battery results.

In some embodiments, the first material comprises lead or bismuth in a proportion by weight of at least 20%, in particular of at least 40%. Lead or bismuth are thus not present in the electrodes merely in small proportions, in particular as an impurity, but rather constitute an integral material of the electrodes. This guarantees that the overvoltage potential with respect to hydrogen is so low that virtually no hydrogen, if any, is produced in the redox flow battery.

In some embodiments, the cathode and/or the anode are at least partially in direct contact with the membrane. The membrane, which in particular adjoins the elevations, delimits a flow channel as a result. The flow direction of the first and/or second electrolyte in the redox flow battery is thus predetermined in a defined manner. By means of this, the contact area that the first and/or second electrolyte have with the electrodes can be set.

In some embodiments, the cathode and/or the anode comprise a second material, wherein the second material comprises polymer fibers or carbon fibers. The fibers may stabilize the respective form of the anode and/or cathode. In addition, depending on the electrode material used, expensive material is replaced by less expensive fiber material. This lowers the production costs for the electrode.

In some embodiments, a proportion by weight of the second material is at least 10%, or at least 15%.

In some embodiments, the first material is arranged as a layer on the second material. The production costs are thus kept as low as possible, since the production of the second material is less expensive and a sufficiently thick layer of the first material exhibits the required overvoltage potential with respect to hydrogen. The thickness of the layer may be in a range from 3 µm to 50 µm, e.g. in a range from 5 µm to 20 µm.

In some embodiments, the anode and/or cathode are designed as a ball electrode or a rod electrode. These forms of the electrodes are easily producible.

In some embodiments, polyoxometalate is used as a reduction-oxidation pair in the first and/or second electrolyte.

FIG. 1 shows a rechargeable redox flow battery 1. The rechargeable redox flow battery 1 comprises a redox flow unit 20. The redox flow unit 20 comprises a membrane 3, where the membrane 3 separates a first chamber 4 and a second chamber 5 from each other. A cathode 15 is arranged in the first chamber 4. An anode 16 is arranged in the second chamber 5. The cathode 15 and the anode 16 are connected to a power grid via an electrical energy connection 12.

The rechargeable redox flow battery 1 additionally comprises a first tank 6 which is connected via a first line to the first chamber 4 with the cathode 15 by means of a first pump 8. The first chamber 4 is in turn connected to the first tank 6 via a third line 10. The rechargeable redox flow battery 1 comprises a second tank 7 which is connected via a second line 18 to the second chamber 5 with the anode 16 via a second pump 9. The second chamber 5 is in turn connected to the second tank 7 with a fourth line 11.

Figure 2:
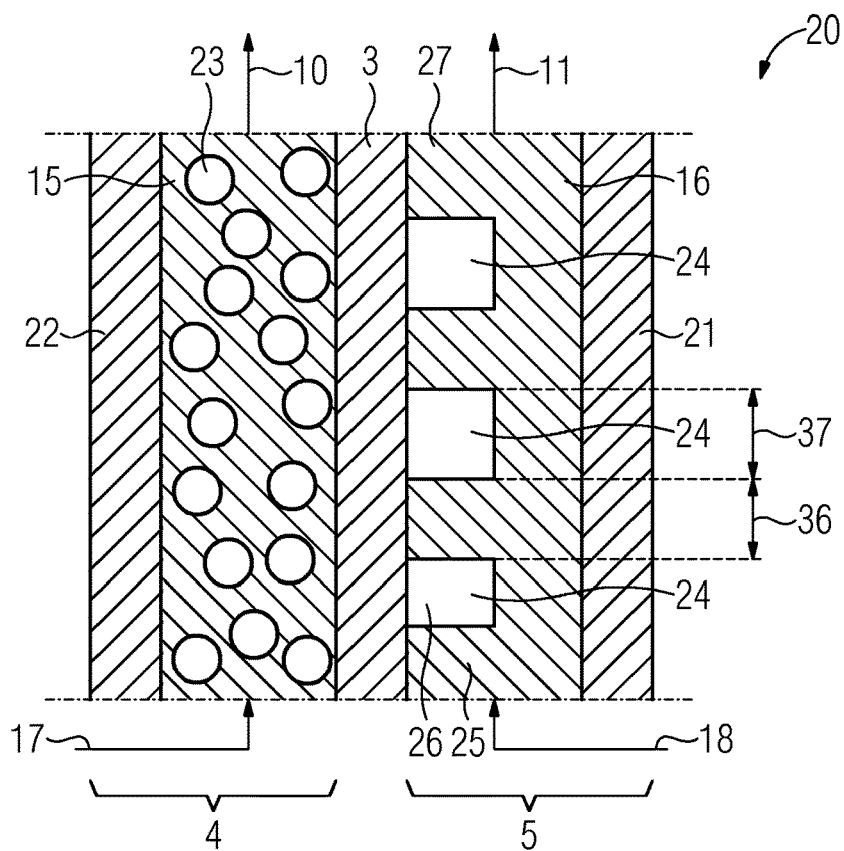
FIG. 2 shows a redox flow unit having an anode with flow channels comprising lead.

FIG. 2 shows a first exemplary embodiment of a redox flow unit 20 having a first chamber 4 in which a porous graphite electrode, in this case the cathode 15, is arranged. The redox flow unit 20 additionally comprises a second chamber 5 in which a planar anode 16 with elongate elevations 27 is arranged. The cathode 15 directly adjoins a current collector 22. The anode 16 likewise adjoins a current collector 21. The graphite electrode 15 is in contact with both the current collector 22 and the membrane 3. The anode is in complete contact with the collector 21 and is in partial contact with the membrane by means of the elevations 27.

Flow channels 26 are formed between the elevations 27. The flow channel has a first width 36 and a second width 37. The second width 37 increases in this exemplary embodiment. The first width 36 is typically in a range from 0.5 mm to 20 mm, e.g. from 1 mm to 10 mm. The second width 37 of the flow channel 24 is typically in a range from 0.05 mm to 20 mm, e.g. from 0.1 mm to 10 mm. The first width 36 is constant. In some embodiments, the first and second widths 36, 37 may decrease along the flow channel 26 or both widths may be constant. The cross sections can in particular be chosen depending on a desired target residence time of the anolyte at the anode. The flow channels 26 are delimited on three sides by the anode 16 and on one side by the membrane 3.

The planar anode 16 comprises a first material 25, wherein in this exemplary embodiment the first material comprises at least 10% lead. The anode 16 itself is not porous. In some embodiments, the anode 16 may comprise at least 10% bismuth. The anode may additionally comprise carbon and carbon. Alloys, in particular of lead or bismuth, can also be used.

An electrolyte as catholyte 23 is fed into the first chamber 4. The catholyte 23 flows through the pore structure of the graphite electrode 15. An electrolyte as anolyte is fed into the second chamber 5. The anolyte flows in a meandering manner through the flow channels 26 of the anode 16. Although the residence time of the anolyte at the anode is shortened compared to porous electrodes, the reduction-oxidation pairs which are typically used in redox flow cells and are in particular based on polyoxometalate can be effectively reduced or oxidized even with short residence times. The residence time can be modified using the form of the flow channels 26, so that the residence time can be adapted depending on the reduction-oxidation pair used. As a result of the low overvoltage potential with respect to hydrogen, hydrogen production at the anode is advantageously reduced compared to porous electrodes.

Figure 3:
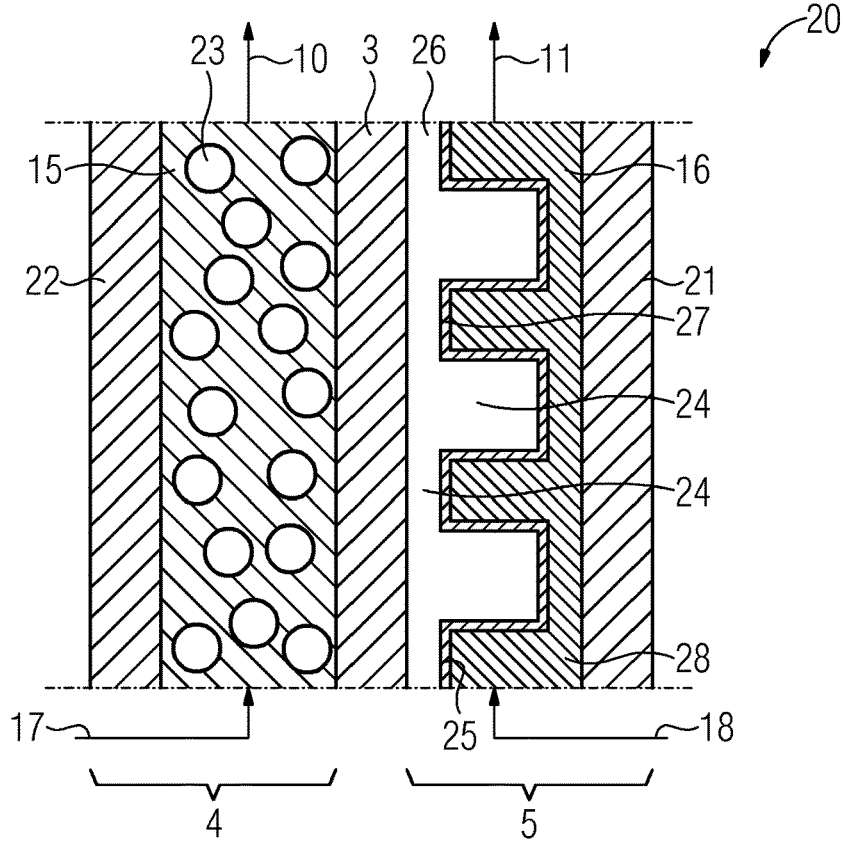
FIG. 3 shows a redox flow unit having an anode with flow channels comprising two layers.

FIG. 3 shows a second exemplary embodiment of a redox flow unit 20 having a porous graphite electrode in the first chamber 4 and a planar anode 16 with elevations 27 in the second chamber 5. In contrast to the first exemplary embodiment from FIG. 2, the anode is in contact only with the current collector 21 and not the membrane 3. In this second exemplary embodiment, the anode 16 additionally comprises two materials which are arranged one above the other in the manner of layers. The main body of the anode 16 essentially comprises the second material 28 and is coated with a layer comprising the first material 25. In this exemplary embodiment, the second material 28 comprises polymer fibers. In some embodiments, the second material may also comprise carbon fibers.

An electrolyte as catholyte is fed into the first chamber 4. The catholyte flows through the pore structure of the graphite electrode. An electrolyte as anolyte is fed into the second chamber 5. The anolyte flows along the flow channel 26 and in the process also penetrates into the depressions between the elevations 27. This arrangement is suitable in particular for reduction-oxidation pairs for which a short residence time at the anode suffices to ensure a sufficient degree of oxidation for storing the energy. Such a construction is suitable in particular if a polyoxometalate is used as reduction-oxidation pair.

Figure 4:
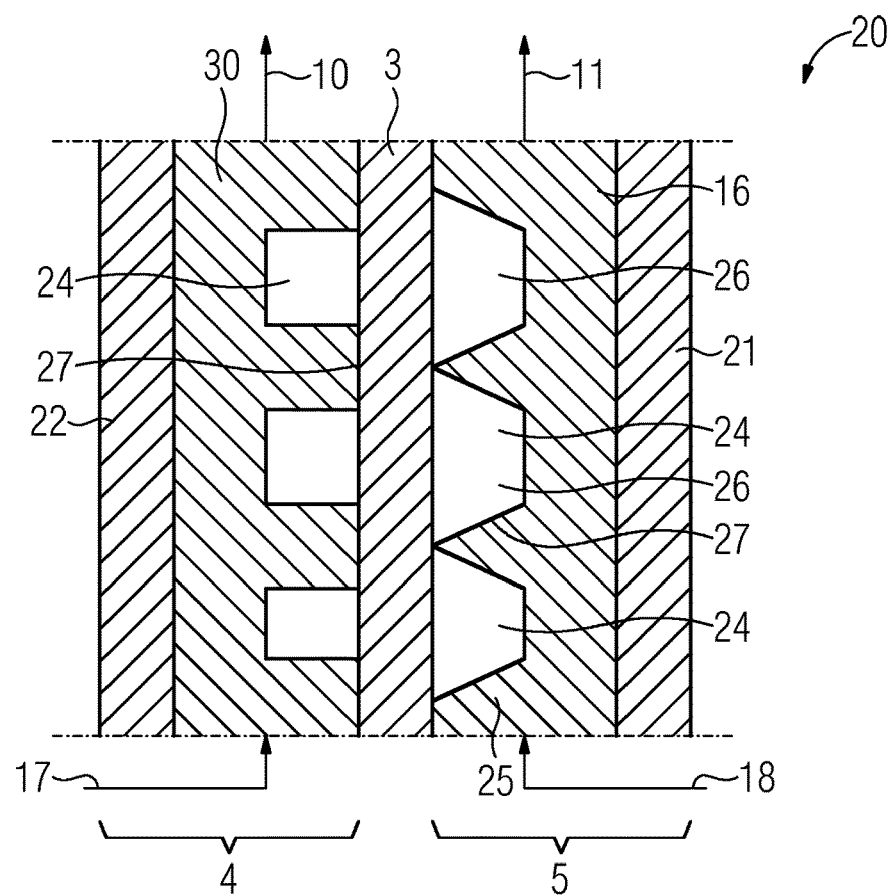
FIG. 4 shows a redox flow unit having a cathode with a first form of flow channels and an anode with a second form of flow channels.

FIG. 4 shows a redox flow unit 20 according to a third exemplary embodiment. A planar cathode 30 with elevations 27 and flow channels 26 is arranged in the first chamber 4. A planar anode 16 with elevations 27 is arranged in the second chamber 5. The elevations 27 differ in terms of their form. The cathode 30 has cuboid elevations; the anode 16 has pyramidal elevations. In this example, the peaks of the pyramids are in contact with the membrane 3. Flow channels 26 through which the anolyte can flow are thus formed. In this example, the catholyte also flows in a meandering manner over the cathode 30.

The exemplary embodiments can be combined with one another. For instance, the anode in the first exemplary embodiment may also comprise two layers. All embodiments of the anode mentioned can likewise be carried over to the cathode. In particular, a planar cathode 30 with elevations 27 can be arranged in the first chamber 4 and a porous anode can be arranged in a redox flow unit 2. The elevations 27 on the electrode may also have different forms in all three exemplary embodiments. The different forms are illustrated in FIGS. 5 to 9 on the basis of the anode 16. However, they can likewise be carried over to the cathode 30.

Figure 5:
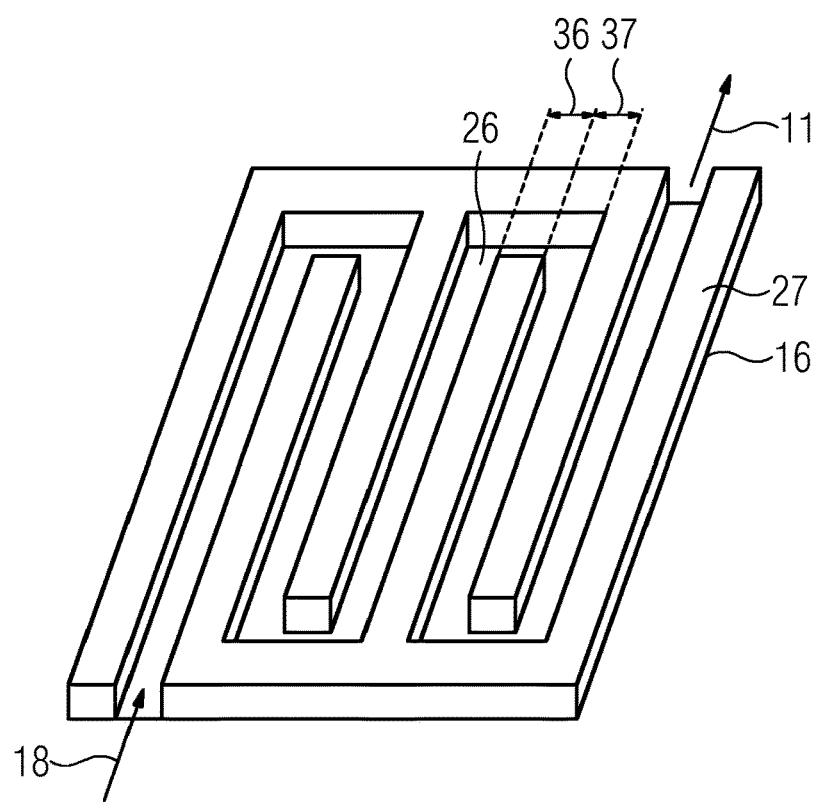
FIG. 5 shows a planar anode with elevations arranged in a meandering form.

FIG. 5 shows elevations 27 as they are arranged in the case of the anode 16 in the first and second exemplary embodiment and in the case of the cathode 30 in the third exemplary embodiment. The elevations form a meandering flow channel 26.

Figure 6:
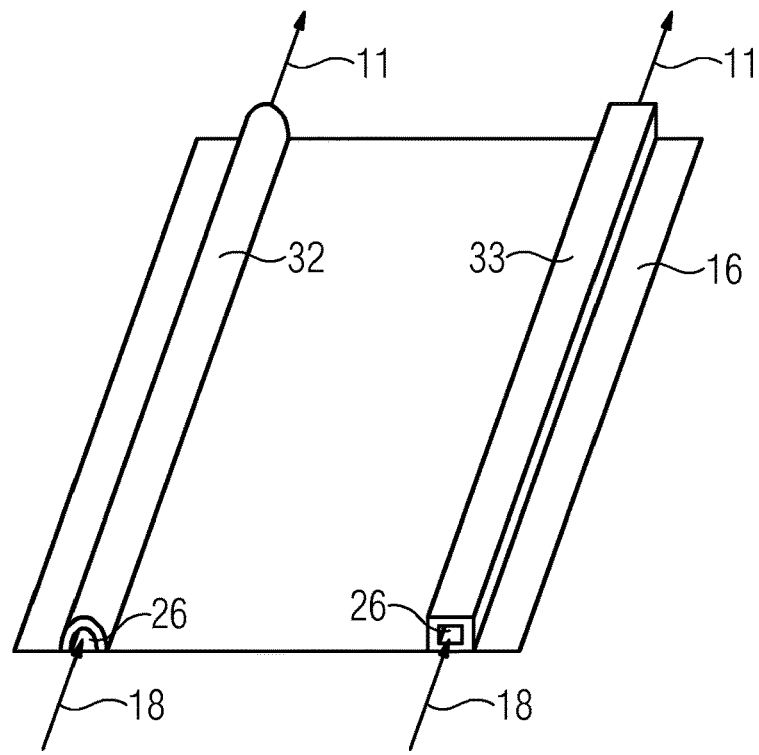
FIG. 6 shows a planar anode with elongate elevations.

FIG. 6 in each case shows flow channels 26 which are formed by cavities in cylindrical or cuboid elevations 27. These flow channels 26 exhibit a very short residence time for the electrolyte at the electrode. Here, the residence time is similar to that of a completely planar, essentially smooth surface of an electrode. Such an electrode is also conceivable, but not portrayed here.

Figure 7:
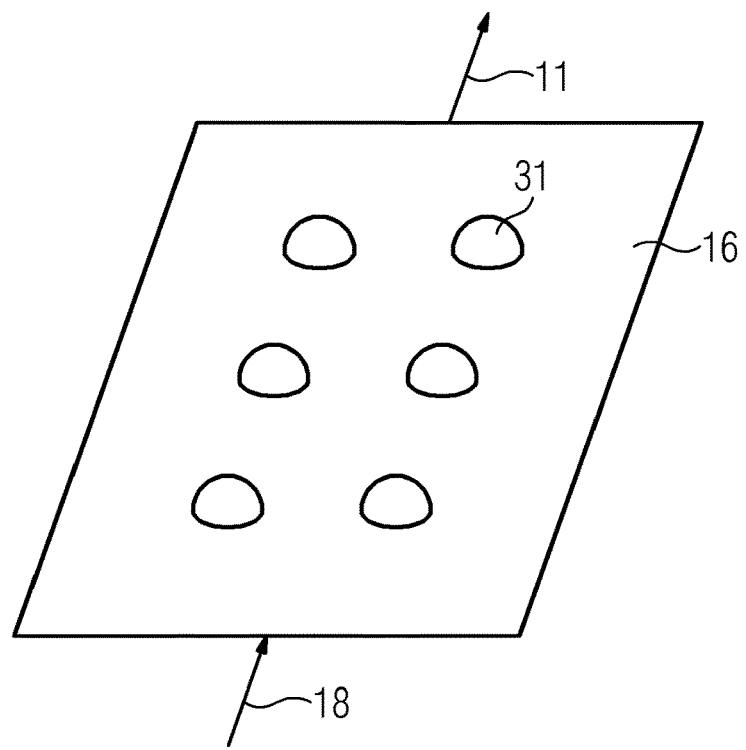
FIG. 7 shows a planar anode with hemispherical elevations.
Figure 8:
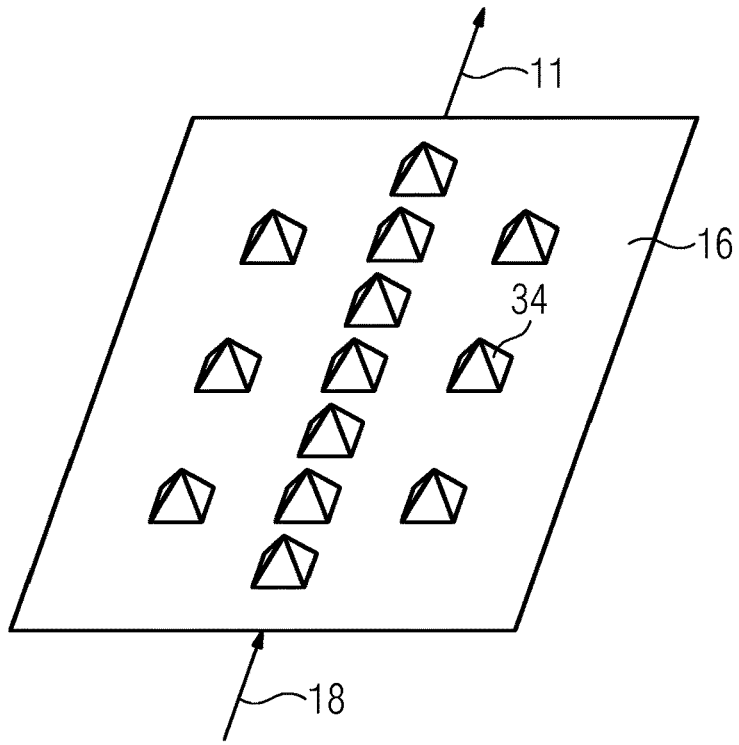
FIG. 8 shows a planar anode with pyramidal elevations.
Figure 9:
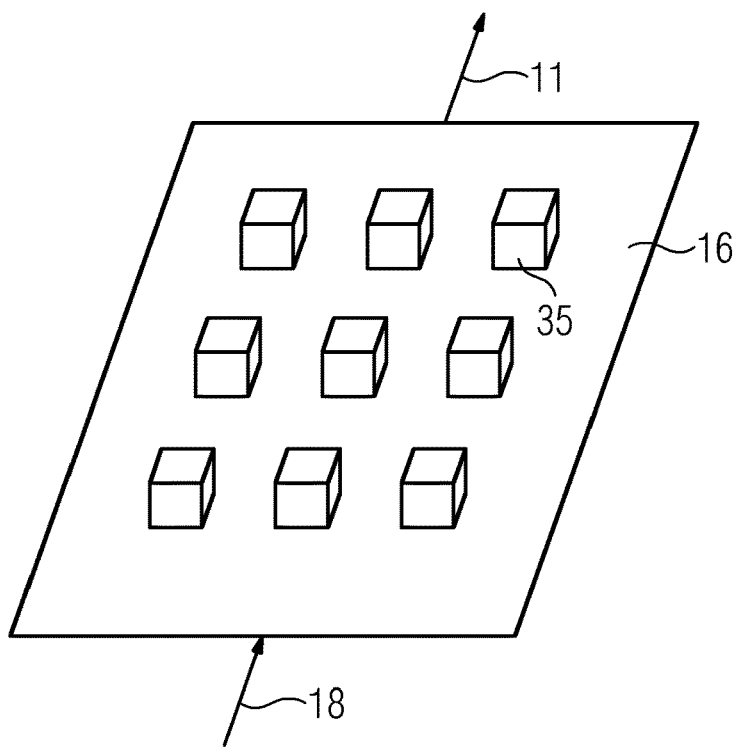
FIG. 9 shows a planar anode with cubic elevations.

The anode 16 comprises hemispherical elevations 31 in FIG. 7, pyramidal elevations 34 in FIG. 8 and cubic elevations 35 in FIG. 9. The number of elevations may be different. The more elevations are arranged on the anode 16, the greater the residence time of the anolyte on the anode 16 becomes.

What is claimed is:

1. An electrically rechargeable redox flow battery comprising:
    first chamber;
    a second chamber;
    a membrane separating the first chamber from the second chamber;
    a cathode in the first chamber; and
    an anode in the second chamber;
    wherein at least one of the cathode and the anode comprises a first planar surface including elevations enlarging the surface area;
    wherein the elevations form flow channels for an electrolyte;
    wherein the at least one of the cathode and the anode comprises a ball electrode or a rod electrode;
    wherein the at least one of the cathode and the anode further comprises a material selected from the group consisting of: lead, bismuth, zinc, titanium, molybdenum, and tungsten.

2. The redox flow battery as claimed in claim 1, wherein the at least one of the cathode and the anode comprises lead or bismuth.

3. The redox flow battery as claimed in claim 1, wherein the elevations have a first long side and a second short side.

4. The redox flow battery as claimed in claim 1, wherein the elevations are arranged in parallel or in a meandering form.

5. The redox flow battery as claimed in claim 2, wherein the at least one of the cathode and the anode comprises lead or bismuth in a proportion by weight of at least 20%.

6. The redox flow battery as claimed in claim 5, wherein the at least one of the cathode and the anode comprises lead or bismuth in a proportion by weight of at least 40%.

7. The redox flow battery as claimed in claim 1, wherein at least one of the cathode and the anode are in direct contact with the membrane.

8. The redox flow battery as claimed in claim 1, wherein at least one of the cathode and the anode comprises fibers of polymer or carbon.

9. The redox flow battery as claimed in claim 8, wherein a proportion by weight of the fibers is at least 10%.

10. The redox flow battery as claimed in claim 9, wherein the material of the at least one of the cathode and the anode comprises is arranged as a layer on the fibers.

11. The redox flow battery as claimed in claim 1, wherein the electrolyte comprises a polyoxometalate used as a reduction-oxidation pair.

* * * * *